United States Patent [19]
Bardet

[11] 3,817,214
[45] June 18, 1974

[54] INCUBATORS FOR EGGS
[75] Inventor: Michel Bardet, Tours, France
[73] Assignee: Buckeye Stephens Limited, Gloucester, England
[22] Filed: Nov. 8, 1971
[21] Appl. No.: 196,463

[30] Foreign Application Priority Data
Nov. 10, 1970 Great Britain.................. 53461/70

[52] U.S. Cl. ............................................. 119/37
[51] Int. Cl. ...................................... A01k 41/00
[58] Field of Search ............................ 119/35, 37

[56] References Cited
UNITED STATES PATENTS
| | | | |
|---|---|---|---|
| 2,230,158 | 1/1941 | Crawford | 119/37 |
| 2,296,930 | 9/1942 | Ihler | 119/37 |
| 2,704,531 | 3/1955 | Bailey | 119/35 X |
| 2,864,336 | 12/1958 | Hamnett | 119/35 X |

Primary Examiner—Hugh R. Chamblee
Attorney, Agent, or Firm—Larson, Taylor and Hinds

[57] ABSTRACT

During the incubating of living eggs in a closed volume the desired conditions are maintained by pre-conditioning air in a pre-conditioner outside the volume and feeding the pre-conditioned air into the volume in accordance with the conditions in the volume as sensed by an element within the volume, e.g. a wet-bulb thermometer. If the pre-conditioning of the air is carried out in a suitable manner, the metabolic products of the eggs can be substantially balanced by the air introduced into the volume, so that the desired environmental conditions are maintained in the volume.

9 Claims, 3 Drawing Figures

INCUBATORS FOR EGGS

This invention relates to incubators for eggs and methods for incubating eggs.

It is necessary to maintain in incubators a closely controlled temperature and minimum oxygen and relative humidity levels.

In the past this has been done by providing within the incubator chamber heaters, coolers (for when the ambient temperature might exceed the desired temperature), water sprays and a fan for driving air from the outside atmosphere through the incubator. The heaters and coolers and the fan were all controlled by dry-bulb thermometers and the water-spray by a wet-bulb thermometer.

There are many disadvantages of such systems which, however, are universally in use today. The two main ones are these. First, the presence in the chamber of the water sprays which, when they work, can cause both cooling of the chamber (and thus hunting of the controls) and the presence of standing water on the chamber floor which is insanitary and dangerous. Moreover the eggs and any electrical apparatus must be protected from being directly sprayed. Second, the fact that the fan and heaters are responsive only to dry-bulb temperatures means that, under some conditions of the ambient atmosphere, the working of the fan can increase the temperature in the incubator instead of lowering it as it is assumed to. Then, emergency intervention is needed.

Also, since the overall rate of ventilation is a function of ambient temperature, the conditions inside the chamber will also vary with ambient temperature because of the excretion from the living eggs which are in it of water and $CO_2$. Under conditions of high humidity and temperature, for example, a high rate of ventilation may increase humidity while decreasing the $CO_2$ level in the chamber. Conversely if there is a low ambient temperature and low humidity, the heaters and the sprays tend to counteract each other and there is also a low rate of ventilation resulting in a rise of $CO_2$ level.

These disadvantages can be mitigated by specifying that a given container shall at all times have a given charge of eggs of a given average age, because then for average ambient temperature conditions the average heating, water supply or cooling requirements can be calculated and heaters etc. of appropriate size can be provided.

The invention, however, is based on an entirely different approach to these problems. Basically it has previously been assumed that the products of the metabolism of the eggs should be flushed out of the incubator, and the fact that the water and heat produced by the eggs could be used to help the control of their environment has been quite ignored.

Once this realisation has been made methods of incubation and egg incubators can be defined which are free of these disadvantages and which can afford extremely precise control of the environment of the eggs within the incubator. In contrast to the prior art no liquid water is introduced into the incubator for humidity control; the humidity in the incubator is due to the water vapour excreted from the eggs and is kept in control by introducing preconditioned air of a lower absolute humidity and controlling its introduction by reference to the relative humidity in the incubator. The implications of this are startling. Theoretically, no source of heat or cooling is needed within the incubator (except the eggs themselves which give out heat) for the maintenance of precisely controlled relative humidity, temperature and $CO_2/O_2$ levels. And the behaviour of a given incubator becomes independent of the size or the effective age of its charge of eggs.

Of course in practice extremes of ambient temperature would require excessively powerful and precise preconditioner, and heat losses from the incubator cannot be accurately compensated for. So auxiliary heaters (and possibly coolers) may be provided within the incubator and are controlled in accordance with dry bulb temperature in the incubator, but since air is introduced under controlled conditions it performs the bulk of or all of the cooling needed in the incubator while reducing the absolute humidity.

A fuller discussion of the underlying theoretical considerations is given later in this specification.

According to the invention we provide an egg incubator having a thermally insulated container, a controlled air inlet to the container, air conditioning means supplying air at a pre-determined temperature and humidity directly to the controlled inlet and an element responsive to the condition of the atmosphere in the container and actuating the control, and thus determining the amount of conditioned air to be let into the container. The element is preferably a wet-bulb thermometer or an element affected by the temperature and humidity of the atmosphere in correspondence with the wet-bulb temperature, i.e. the temperature sensed by a wet-bulb thermometer.

According to another aspect of the invention we provide a method for incubating eggs in an atmosphere of substantially constant temperature, humidity and carbon dioxide content in an enclosed, thermally insulated volume containing an element responsive to the condition of the atmosphere in the volume, which consists in conditioning air to be admitted to the volume to predetermined temperature and humidity, both lower than the desired values in the volume, to balance the metabolic products of the eggs, and controlling the admission of such conditioned air into the volume in accordance with the condition of the element. The method in another statement of its general execution, consists in admitting to an incubator containing living eggs, air which has been pre-conditioned to a temperature and an absolute humidity lower than that which is required in desired conditions of operation of the incubator so that the difference between the two is compensated solely or principally by the heat and water output due to the metabolism of the eggs themselves.

The method may additionally include the control of auxiliary dry heating means by means of an element responsive to dry temperature in the volume.

A general discussion of the background of the invention, and a description of a specific embodiment of it will now be given with reference to the accompanying drawings, wherein.

Figure 1:
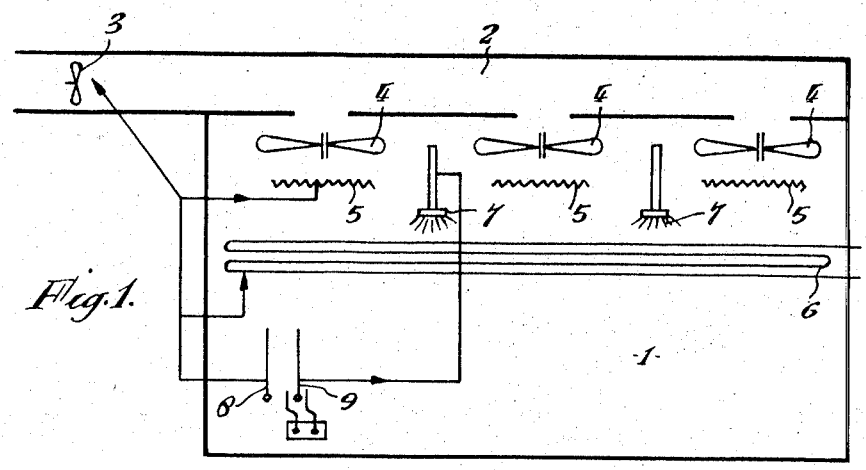
FIG. 1 shows schematically a prior art arrangement.

A prior art incubator and some of its relevant controlls are shown in FIG. 1. It has a thermally insulated container 1 in which eggs are to be held under desired temperature and humidity conditions. The composition of the air particularly with regard to its oxygen and carbon-dioxide content also has to be controlled.

Air is introduced into the container 1 by trunking 2 through which it is driven by an inlet fan 3. Inside the containers are distributor fans 4, heaters 5 to act on the air moved by the fans 4 and cooling coils 6.

Humidity of the air within the container is primarily controlled by injectors 7 which are provided to inject water into the container in the form of a fine mist or spray some or all of which then evaporates to increase the humidity.

These various heating, cooling and humidifying means are controlled by a dry-bulb thermometer 8, which acts to vary the rate at which the inlet fan 3 works (or to switch it on and off) in accordance with the temperature sensed in the container, and acts also to control either the heating or cooling coils 5 or 6 according to what is needed to maintain the desired conditions. A wet-bulb thermometer 9 senses when the relative humidity within the container gets too low and causes the water injector 7 to be switched on. The $O_2$ and $CO_2$ contents of the atmosphere can only be maintained at the desired levels by ensuring that sufficient air is introduced to the container.

The several disadvantages of this container have been discussed above.

Figure 2:
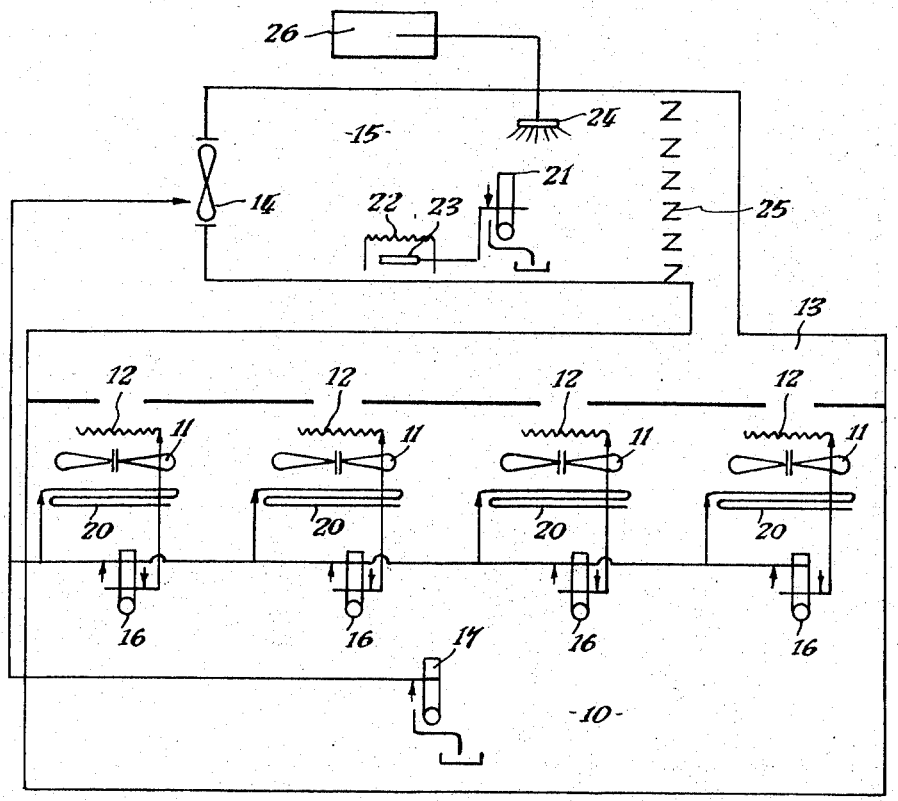
FIG. 2 shows schematically one embodiment of the present invention.

One embodiment of the present invention is illustrated schematically in FIG. 2. As before, there is a thermally insulated container 10 for the reception of eggs to be incubated. As before, there are ventilation distributing fans 11 and heaters 12 and coolers 20, and inlet air trunking 13 the amount of air injected into the container 10 being controlled by a fan 14. The first way in which this embodiment differs from the prior art is that an air conditioning apparatus 15 pre-conditions the air which is to be driven by the inlet fan 14. During operation this is the only way in which air enters the volume 10. Secondly although the input fan 14 is operated by any one of four dry bulb thermometers 16 whenever the temperature rises above a certain level as in the prior art arrangement, it is mainly operated in accordance with a wet-bulb thermometer 17 located within the volume 10 whenever the humidity level as sensed by the wet-bulb thermometer 17 rises above a selected maximum. Thus in contrast to the prior art scheme discussed above, air input is controlled by an element responsive to the wet-bulb temperature in the incubator, and the air which is injected into the incubator container 10 is of controlled temperature and humidity at the time it is injected. The wet-bulb thermometer 17 controls only the overall rate of introduction of air. The heaters 12 and coolers 20 are merely auxiliaries which only marginally operate in the control of the environment in the container 10 in that they directly affect only its dry-bulb temperature.

The air-conditioner 15 is a comparatively simple arrangement wherein an inlet is controlled by the fan 14 and air within the body of the conditioner is both humidified and heated by water vapour given off from water-baths 22 (only one is shown) heated by immersion elements 23. The water-baths 22 are topped up automatically by means not shown.

The immersion elements 23 are controlled in accordance with the wet-bulb temperature sensed by a wet-bulb thermometer 21.

If the intake air is too hot to allow the output to be of desired characteristics, this is sensed by a thermometer 26 in the air outside the conditioner, and a cold water spray 24 is switched on to cool and humidify the air as it passes through the conditioner 15. The spray impinges on the wet bulb thermometer 21 also, so that heating of the water-baths 22 continues and humidity is added to the air from that source also. A baffle 25 prevents liquid water being entrained in the air.

Desired conditions in an incubator container (whether of the prior art or according to the present invention) usually involve temperatures of about 100°F, (37.8°C), about 50 percent humidity, about 20–21 percent oxygen, a low percentage of carbon dioxide. Previously about 0.5 percent $CO_2$ has been considered suitable, but we prefer a lower content of carbon dioxide, down to about 0.2 percent.

The air output from the conditioner is most suitably arranged to be at approximately 82°F (dry temperature) and practical tolerance limits are ± 5°F (27.8° ± 2.8°C) and at 65 – 70 percent relative humidity. These conditions give rise to a wet bulb temperature of about 86°F (30°C) in the incubator volume 10. Alternative conditions for the pre-conditioner output are 72°F (22.2°C) (dry temperature) and 70 percent relative humidity, giving rise (in the incubator) to a wet bulb temperature of 82°F (27.8°C).

It is found that during the life of the embryo chick inside the egg, the amounts per unit time of oxygen consumed, and of water, $CO_2$ and heat given out are at all times in a constant proportionality to each other, although during the incubatory period and particularly in the hatching period, these amounts increase enormously. It is usual for this reason to transfer eggs from an incubator called a setter to another called a hatcher because the ventilation requirements are different. This still applies to the present invention, which is applicable to both with the same theoretical basis, but where the energy requirements will be of a different order.

Figure 3:
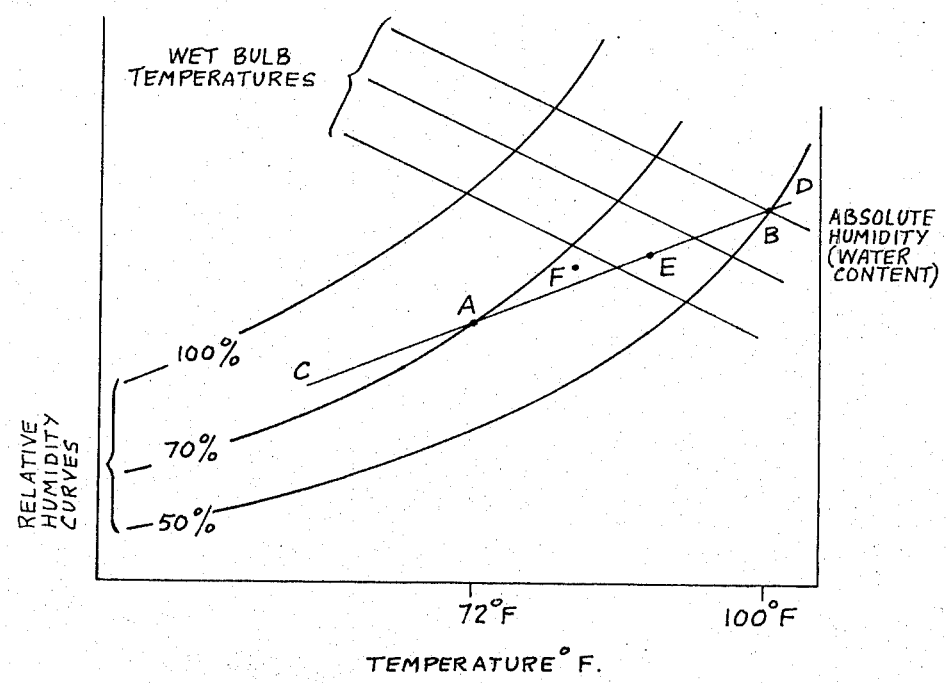
FIG. 3 is a graph showing schematically the general type of relationship between absolute humidity, dry temperature, relative humidity and temperature as determined by a wet bulb thermometer.

The relationship between two of these parameters, temperature and humidity are shown in FIG. 3. A selected point B represents desired temperature and humidity conditions in the container. Eggs tend to produce heat and water and the effect of the presence of living eggs in the container would be to increase temperature and humidity towards D on a straight line CD. It is to be understood that the graph is given solely to indicate qualitatively the nature of the effects involved and it is in no way intended to represent actual slopes. The slope of the line CD is independent of the number of eggs present in the incubator and is also independent of the age of the eggs (remembering that a proportionality is preserved throughout the life of the egg as between the water and heat output). It is also to be remembered that a graph constructed to show the interrelationship of any other pair of the various parameters would exhibit similar characteristics. The point B on the line CD represents desired conditions for incubators, viz. 100°F (37.8°C) and 50 percent relative humidity.

Therefore, to maintain temperature and humidity in the incubator container 10 at the point B, it is sufficient to inject into the container air of temperature and humidity corresponding to a point which lies on the line CD to the left and lower than point B. The air injected is then such as to cool and lessen the total humidity of the container so as to compensate for and balance the effect of the eggs. The amount of conditioned air per unit time required by the incubator in order to maintain the desired conditions of point B depends on the proximity to point B of the point on line CD which represents the temperature and humidity of the conditioned air being introduced into the incubator. Obviously if the injected air has conditions corresponding to point B itself, air must be introduced into the container at an infinite rate. An infinite rate would serve to maintain the $CO_2$ content of the air in the container at the same level as the $CO_2$ content of the air being introduced (i.e. the normal atmospheric content).

The amount of $O_2$ introduced is directly proportional to the amount of air introduced per unit time; the amount of $CO_2$ produced by the eggs per unit time is proportional to the amounts of heat and water produced by the eggs; the amount of air introduced is proportional to the amounts of heat and water produced by the eggs per unit time; it follows from this (and can be shown algebraically) that if the temperature and humidity in the container are held constant, so also is the $CO_2$ content of the air in the container. Similarly the oxygen content remains constant.

The actual level of the $CO_2$ content is determined by the position on the line CD of the point which represents the temperature and humidity of the air introduced, since the position of this point controls the overall rate at which the air is introduced into the container. Thus, it has been found that the introduction of atmospheric air under conditions given by the point A (i.e. 72°F (22.2°C) dry bulb temperature and 72 percent relative humidity) leads to a $CO_2$ content in the container of about 0.2 percent. A point E, rather nearer B would lead to a $CO_2$ content of about 0.1 percent. However, at least twice as much air per unit time would need to be introduced in order to maintain the conditions of point E as compared with point A. This would raise the power consumption of the air conditioner and of the fan 14.

The last paragraph discusses a situation which is perhaps theoretical in that it assumes no heat loss from the incubator and perfect control of the conditions under which air is injected. Heat loss does in fact occur and could represent a vector directed vertically downwardly from the point B. Since the incubator is kept at constant temperature this vector is a constant. But its effect on the slope of the line CD is indeterminate because the rate of progression along that line due to the metabolism of the eggs is a function both of their effective age and of their number. Thus marginal compensation for heat loss must be made empirically.

Further, we prefer to use the economical form of conditioner shown, with low energy consumption, and this at least in more extreme climates cannot be relied on to precondition air more accurately than within the ranges quoted. It is therefore desirable to provide the coolers 20 controlled by dry-bulb thermometer to work if a temperature of 100°F is exceeded, and also to cause the fan 14 to be switched on under the same conditions so that there is an increased rate of ventilation, as in the embodiment shown in FIG. 2.

There is also the possibility that, e.g. because the air introduced is incorrectly conditioned, the temperature and absolute humidity of the container atmosphere will vary in conjunction in such a manner that the wet bulb temperature remains constant. A control system based only on wet-bulb temperature will not detect such a shift and the auxiliary dry-bulb thermometer 16 and the heaters 12 are provided to correct the situation. If the dry temperature as sensed by thermometer 16 falls below a predetermined minimum, a control system switches on the heaters 12 and the atmosphere is restored to the desired state.

Lastly, if air is introduced which is above the line CD in FIG. 3 e.g. at point F (i.e. is at a higher humidity than would be theoretically desired at a given temperature) the dry-bulb temperature of the incubator will tend to fall. The provision of heaters 12 controlled by the thermometers 16 allows for compensation for this.

The fan 14 introducing the conditioned air into the incubator container 10 is in this example mainly controlled in dependence on the wet-bulb temperature of the atmosphere in the container. The wet bulb thermometer 17 is extremely sensitive, and preferably has a response time under the conditions of operation, of a few seconds or less. For instance, a mercury thermometer 17 has an internal wire which makes contact with the mercury when the wet-bulb temperature rises above a predetermined level. This completes a circuit, switching on, or in another possible arrangement increasing the speed of the fan 14 which drives air in to reduce the temperature and humidity of the atmosphere in the container until the wet-bulb temperature falls and the circuit through the thermometer mercury is broken.

It would be possible to control the inlet fan 14 in dependence on a number of other parameters of the atmosphere in the container e.g. dry-bulb temperature, $CO_2$ content or relative humidity. Control in dependence on wet-bulb temperature is preferred to dry-bulb temperature because of the speed at which a constant water vapour content is established throughout the incubator container after the introduction of air, in contrast with the relatively slow attainment of constant temperature, but primarily because of the uniformity of this condition throughout any enclosed space. We have found that if the wet-bulb thermometer is set to operate the fan at 82°F (27.8°C) (corresponding to 100°F (37.8°C) dry-bulb temperature and 50 percent relative humidity) and the air is pre-conditioned to 70 percent relative humidity at 72°F (22.2°C), a very high percentage of eggs incubated in the container hatch satisfactorily. The wet bulb temperature is a measure of the enthalpy (or heat content) of the air in the incubator.

If the wet bulb temperature falls or the dry temperature rises beyond pre-determined limits, an alarm system is triggered and an operator can intervene to restore the container atmosphere to the desired state.

I claim:

1. A method of incubating living eggs in an incubator in which the atmosphere is maintained at conditions of temperature and absolute humidity suitable for incubation of eggs therein, the method comprising admitting at a controlled rate to said incubator containing living eggs, air which has been pre-conditioned to substantially constant conditions of temperature and an absolute humidity lower than the temperature and absolute humidity which is maintained in the incubator during substantially constant conditions of operation of the incubator, and controlling the said rate such that the difference between the pre-conditioned and the maintained conditions of heat and absolute humidity in the incubator is made up solely or principally by the heat and water output due to the metabolism of the eggs themselves such that the temperature and absolute humidity within said incubator are maintained at said suitable conditions.

2. A method according to claim 1 wherein the rate at which the said pre-conditioned air is passed into the incubator is increased when the temperature value in said incubator indicated by a wet-bulb thermometer rises above a predetermined level.

3. Method according to claim 2 including heating the air within the incubator by a dry heater provided within the incubator when the dry-bulb temperature falls below a predetermined value.

4. Method according to claim 3 including cooling the air within the incubator by a dry cooler provided within the incubator when the dry-bulb temperature rises above a predetermined value whereby the dry-bulb temperature within the incubator is maintained between closely defined limits.

5. Method according to claim 4 wherein the said air is passed into the incubator when the said dry coolers operate as well as when the wet-bulb temperature rises above a pre-determined level.

6. Method according to claim 1 wherein the pre-conditioning is such as to bring the temperature and relative humidity of the said air passed into the incubator respectively to 82° ± 5°F (27.8° ± 2.8°C) and 65–70 percent.

7. A method according to claim 1 wherein the absolute humidity of the pre-conditioned air is selected in relation to the desired absolute humidity within the incubator such that a said desired level of $CO_2$ content is maintained in said incubator, the rate at which the pre-conditioned air is passed into the incubator being increased when the wet-bulb temperature in the incubator rises above a predetermined value.

8. A method according to claim 1 including determining the $CO_2$ content prevailing in said incubator and passing said pre-conditioned air into said incubator at a rate dependent upon the determined $CO_2$ content.

9. A method according to claim 1 including determining a condition of temperature, absolute humidity, relative humidity, $CO_2$ content, or $O_2$ content prevailing in said incubator, and passing said pre-conditioned air into the incubator at a rate dependent upon said determined condition.

* * * * *